United States Patent Office 2,839,574
Patented June 17, 1958

2,839,574
PRODUCTION OF LYSINE AND INTERMEDIATES

Marcel Servigne, Sceaux, and Etienne Szarvasi, Clichy, France, assignors to l'Air Liquide, Societe Anonyme pour l'Etude et l'Exploitation des Procedes Georges Claude, Paris, France No Drawing. Application October 1, 1954
Serial No. 459,836

Claims priority, application France October 2, 1953

2 Claims. (Cl. 260—518)

The object of the present invention, is a process for the synthesis of dl-lysine or, more exactly N-α-benzoyl-dl-lysine easily convertible into dl-lysine dihydrochloride, which may be used to various purposes. In particular, dl-lysine constitutes, with trytophane, one of the fundamental amino-acids utilized in biological processes for the formation of proteides. They are elements of growth of higher organisms. They constitute, nowadays, the basis for a balanced feeding of cattle.

Among the methods for the synthesis of dl-lysine proposed heretofore, only the process described in U. S. Patent No. 2,498,300 of February 21, 1950 to Scott et al., and the Eck and Marvel synthesis and its modification by Galat are sufficiently simple to be utilized industrially.

These authors use, as a starting material, cyclohexanone (1) which is transformed into the corresponding oxime (2) then into caprolactame (3), which, hydrolyzed and benzoylated is transformed into the ε-benzoyl-aminocaproic acid (4). Then this product is treated with bromine and α-bromo-ε-benzoylaminocaproic acid (5) is obtained, which becomes transformed, after ammonolysis, into N-ε-benzoyllysine (6) from which, by hydrolysis, lysine dihydrochloride is obtained (7).

The diagram of this synthesis is as follows:

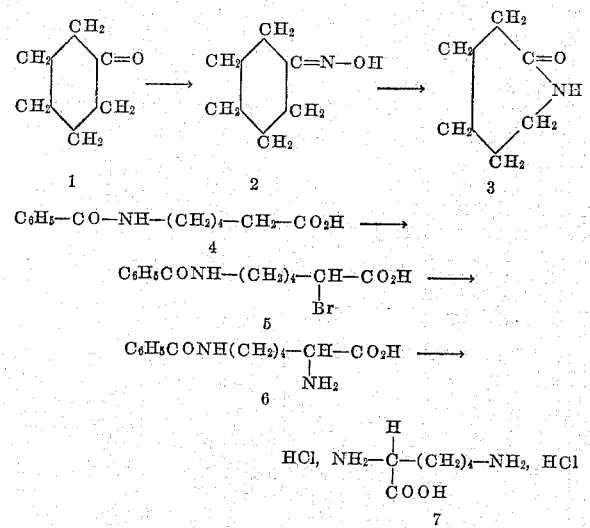

The synthesis method which is an object of the present invention has the advantage of being simpler to put in application than the above Eck and Marvel synthesis and of giving rise, in two of the intermediate operations which constitute the phases thereof to the production of two new industrial products.

This new synthesis method leads to the production of N-α-benzoyl-dl-lysine from which, by hydrolysis, in the known manner, dl-lysine dihydrochloride is obtained.

It consists in starting from a dihalogeno-1,4-butane (the halogen in this substance being designated hereinafter by X), in condensing it with sodium diethyl acetamidomalonate for transforming it into δ-X-butyl-diethylacetamidomalonate, in decarboxylating this substance by means of hydrochloric acid, in benzoylating it without separating the intermediate δ-amino-ε-X-caproic acid hydrochloride formed, for transforming it into α-benzoylamino-ε-X-caproic acid and finally in subjecting this acid to ammonolysis for obtaining N-α-benzoyl-dl-lysine.

One advantage of this synthesis method over the Eck and Marvel method, lies in the fact that there are introduced into the molecule, from the very first operation, the essential functions (the acid as an ester, the amine function under an acetylated form, and an halogen), while the above authors, having in the combination (4) only the acid function and one of the amine functions (under a benzoylated form), are compelled to insert an additional operation (introduction of the halogen, combination 5), before reaching the benxoyllysine. In the synthesis according to the invention, N-α-benzoyl-dl-lysine is obtained, the isomer of N-ε-benzoyl-dl-lysine obtained by Eck and Marvel.

In a preferred mode of carrying out the method of the invention, the dihalogeno-1,4-butane used at the start, is bromo-1-chloro-4-butane which is obtained easily from tetrahydrofuran, for instance, which is a commercial product prepared from acetylene or furfural.

With this compound used as a starting product, the first operation of the above defined method leads to the formation of -δ-chlorobutyldiethylacetamidomalonate (II)

and the second operation leads to the formation of

N-α-benzoylamino-ε-chlorocaproic-acid (III)

and the diagram of the synthesis is as follows:

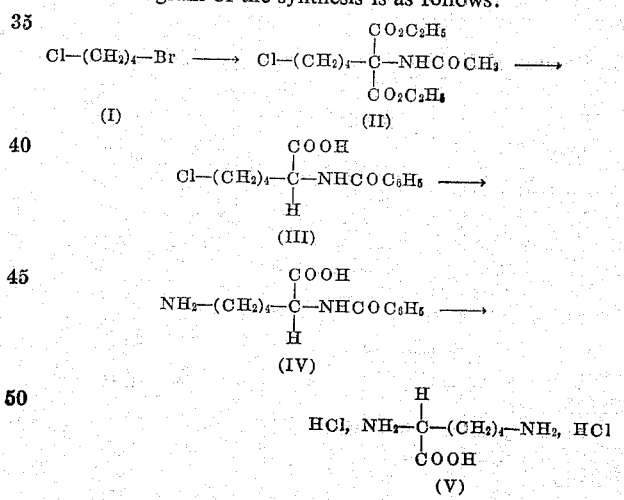

The substances II and III constitute new industrial products, covered as such by the invention and they are capable of various uses. First of all, considered as intermediate products in the synthesis of dl-lysine according to the invention, they make it possible to segregate the operational procedures involved in said synthesis, and to carry them out separately, at will, in time and in space. It is thus possible to prepare and store these compounds which constitute not only materials which can be used for the synthesis of dl-lysine, to which they impart a valuable flexibility as regards its industrial carrying out, but also raw materials capable of being used in other chemical processes. In particular, compound II: (-δ-chlorobutyldiethylacetamidomalonate) can be used as an intermediate product for the synthesis of animated acids, polypeptids or polyamids (synthetic fibres). Compound III (-α-benzoylamino-ε-chlorocaproic acid) may be used for preparing nitrogen-substituted aminated acids which are obtained by replacing ammonia by a primary or secondary amine such as methylamine or dimethylamine. The halogen in compound III may undergo condensations which are characteristic of the halogen group and allow the introduction of various groups into the molecule for obtaining chains of various lengths according to the nature of the substituent. The products thus obtained can be used as intermediate products in the manufacture of various chemical products.

N-α-benzoyl-dl-lysine which is obtained by means of the synthesis according to the invention, was obtained heretofore only in a roundabout manner, and chiefly from N-N'dibenzoyllysine by hydrolysis. The N-α-benzoyl-dl-lysine obtained by the process according to the invention is in the form of a hydrate (with one molecule of water).

The starting material, bromo-1-chloro-4-butane (1) may be prepared according to the method of Starr and Hixon (J. Amer. Chem. Soc. 1934, p. 1595) which consists in reacting $PBr_3$ with δ-chlorobutanol. The high cost of phosphorus tribromide used is a drawback in industrial operation and the invention covers, in itself, a new and more economical process for the preparation of bromo-1-chloro-4-butane. This process consists in reacting dry gaseous hydrobromic acid with boiling δ-chlorobutanol in the presence of a material giving an azeotrope with the water formed during the reaction.

The yield is 70% and the final product obtained is not quite pure but it is suitable for most uses.

A few examples of operational procedures characteristic of the invention will now be described.

Example I

This example concerns the preparation of bromo-1-chloro-4-butane.

One places, in a round 3 tube flask, provided with a device allowing the tapping off of the water formed and a reflux type cooler:

82.5 grams of distillated δ-chlorobutanol, B. P.$_{10}$=74°–5° C. and 100 cm.$^3$ of dry benzene.

The apparatus is connected with a HBr generator.

Hydrobromic acid is passed through the product, first at ordinary temperature, then the temperature is gradually raised until the benzene boils. The water formed during the reaction is constantly decanted off. When no more water is formed, the introduction of HBr is cut off and benzene is distilled under a vacuum. 2 cm.$^3$ of diethanolamine are added to the product and distillation is carried out under vacuum. One obtains:

(1) 4.5 g. as a distillation head;
(2) 63 g. of a slightly yellow product B. P.$_{20}$=71°–75° C.
(3) 25 g. of a colourless liquid B. P.$_{18}$=78°–85° C. The latter fraction is comprised of unreacted δ-chlorobutanol.

Fraction 2 receives an addition of 2 cm.$^3$ of diethanolamine and becomes milky. This product is redistilled under a vacuum and one obtains:

(1) 46 g. of a colourless liquid B. P.$_{17}$=70°–72° C.
(2) 6 g. of a yellow liquid B. P.$_{17}$=72°–74° C.
(3) A red residue in the flask.

Example II

This example concerns the preparation of δ-chlorobutyl-diethylacetamidomalonate.

M. W.=307.76—$C_{13}H_{22}O_5NCl$

One dissolves:

4.6 g. sodium in
200 cm.$^3$ absolute alcohol.

The alcohol is removed, under a vacuum, on a water bath, and 150 cm.$^3$ of dry ethyl carbonate are added.

One adds, while stirring thoroughly:

45.5 g. of ethyl acetamidomalonate, then
35 g. of δ-chlorobromobutane and reflux heating is continued while stirring, for about 20 hours. When the reaction has been completed, the product is poured into an excess of water, the organic layer is decanted and the substance is extracted with ether. The ether is driven off, and the δ-chlorobromobutane which did not react (2 g.) together with the ethyl carbonate are driven off by means of water vapour. The product is poured into a small cup cooled by ice and crystallization is facilitated by stirring with a glass rod. The crystals are dried after remaining a few hours in the refrigerator. After air drying, 52 to 54.5 g. of clear crystals are obtained. Melting point: 44 to 48° C. Yield=88–92%.

After crystallization in 95° C. alcohol, 42 to 43 g. of white crystals are obtained, melting point: 53° C. (heating stage microscope). Yield=71–72.5%. Using highly pure starting materials, one obtains raw δ-chlorobutyl-diethylacetamidomalonate melting at 50° C. (heating stage microscope) which is used as obtained.

C, percent:
  Calculated=50.73
  Found=50.76; 50.91
H, percent:
  Calculated=7.14
  Found=7.10; 7.11
N, percent:
  Calculated=4.54
  Found=4.71; 4.81

These crystals are soluble in most organic solvents and insoluble in water.

Example III

Preparation of α-benzoylamino-ε-chlorocaprolic acid. M. W.=269.71—$C_{13}H_{16}O_3NCl$.

Reflux heating is applied for a time between 4 and 20 hours on:

41 g. of δ-chlorobutyldiethylacetamidomalonate dissolved in: 350 cm.$^3$ of pure HCl (d.=1.19).

The solution is evaporated to dryness on a water bath and under a vacuum. The residue is re-dissolved in 400 cm.$^3$ of water and the aqueous solution is washed with twice 100 cm.$^3$ of ether. The aqueous solution is transferred to a 3-tube round flask provided with a mechanical stirrer, a dropping funnel and a thermometer. The solution is neutralized by a lye of concentrated sodium hydroxide, keeping the temperature below 10° C. Then one adds, through the dropping funnel:

10.7 g. NaOH in pellets, dissolved in an equal volume of water, then
18.5 g. of benzoyl chloride.

During the entire reaction, the temperature of the mixture is kept below 10° C. Stirring is continued at that temperature for an hour, then the liquid is filtered and acidified by a solution of 10% HCl (acidity=Congo red). An abundant white precipitate is formed.

It is dried and washed with 5 times 100 cm.$^3$ distilled water, then with 4 times 100 cm.$^3$ of petroleum ether (d=0.65–0.66). After air drying, one obtains 32.5 g. of white crystals (melting point=133.5–135° C.).

5 g. of this product are dissolved in 40 cm.$^3$ of hot 95° alcohol and precipitated by an addition of 120 cm.$^3$ water. Washing and drying as above.

Melting point=139–140° C.
Acid number:
  Calculated=207
  Found=209
N, percent:
  Calculated=5.19
  Found=5.11; 5.27

The product is scarcely soluble in ether, soluble in alcohol, more soluble when hot, highly soluble in acetone, insoluble in petroleum ether and in water. The raw product may be utilized with advantage.

*Example IV*

Preparation of N-α-benzoyl-dl-lysine monohydrate, M. W.=268.30, $C_{13}H_{18}O_3N_2$, $H_2O$.

One heats, in a pressure bottle, during two days and a half at a temperature of 52–55° C., 16 g. of α-benzoylamino-ε-chlorocaproic acid with 350 cm.³ pure 34% ammonia.

When the reaction is completed, the presence is observed of an important amount of white crystals in the bottle. The mixture is cooled in an ice bath. The white crystals are centrifuge-dried, washed in water until the washing waters are free of Cl, then with 100 cm.³ acetone. One dries in air.

One obtains:

11 g. of white crystals=melting point=215° C. (heating stage microscope).

After concentration of the mother liquor one obtains: a second product=1 g. Melting point=190°–5° C. (heating stage microscope) and a third product=0.5 g. Melting point=185–90° C. (heating stage microscope).

Total yield=12.6 g.=85% (theoretical yield 14.5 g.).

N, percent:
  Calculated=10.44
  Found=10.33; 1032
Solubility in water:
  Cold, 0.4 g. per litre
  Boiling, 10 g. per litre.

The product is insoluble in benzene, chloroform and acetone. It can be transformed into lysine dihydrochloride, using the Eck and Marvel method, or into dl-lysine monohydrochloride with a small modification of this method, as follows: after chlorhydric hydrolysis of the benzoyllysine, the solution is evaporated to dryness and the brown dihydrochloride obtained is treated with boiling ethanol. The insoluble fraction is separate and the filtrate is treated with pyridine for obtaining the dl-lysine monohydrochloride.

What we claim is:

1. A method for the synthesis of N-α-benzoyl-dl-lysine, consisting in starting from bromo-1-chloro-4-butane, in condensing it with sodium diethyl-acetamidomalonate for transforming it into δ-chloro-butyl-diethylacetamidomalonate, in decarboxylating this substance with a non-oxidizing mineral acid, in benzoylating in situ the intermediate α-amino-ε-chlorocaproic acid salt formed, for transforming it into α-benzoylamino-ε-chlorocaproic acid and finally in subjecting this acid to ammonolysis for obtaining N-α-benzoyl-dl-lysine.

2. A method for the synthesis of N-α-benzoyl-dl-lysine according to claim 1, wherein the bromo-1-chloro-4-butane is prepared by reacting the gaseous and dry hydrobromic acid with δ-chlorobutanol in the presence of a substance giving an azeotrope with the water formed during the reaction.

References Cited in the file of this patent

UNITED STATES PATENTS

| | | |
|---|---|---|
| 2,498,300 | Scott et al. | Feb. 21, 1950 |
| 2,519,038 | Galat | Aug. 15, 1950 |

FOREIGN PATENTS

| | | |
|---|---|---|
| 618,591 | Great Britain | Feb. 24, 1949 |